Sept. 17, 1968 P. NYROP 3,401,798
CYLINDRICALLY STACKED AND SPIRALLY CONFIGURED SEMI-PERMEABLE
MEMBRANE LAMINATE APPARATUS
Filed Jan. 4, 1965 4 Sheets-Sheet 1

INVENTOR.
PER NYROP
BY
ATTORNEY.

INVENTOR.
PER NYROP
BY J. Dennis Malone
ATTORNEY.

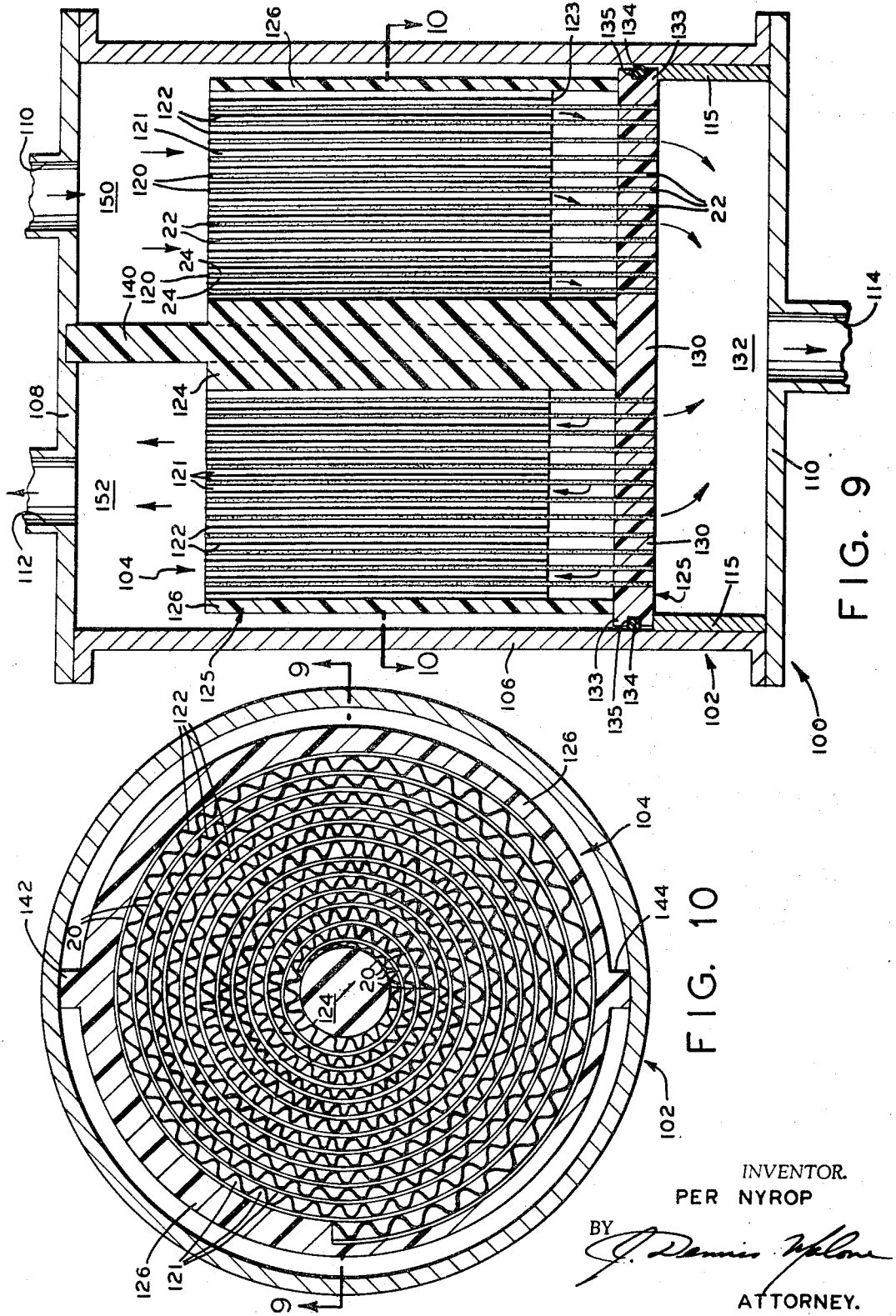

INVENTOR.
PER NYROP
ATTORNEY.

United States Patent Office 3,401,798
Patented Sept. 17, 1968

3,401,798
CYLINDRICALLY STACKED AND SPIRALLY CONFIGURED SEMI-PERMEABLE MEMBRANE LAMINATE APPARATUS
Per Nyrop, Norwalk, Conn., assignor to Dorr-Oliver Incorporated, Stamford, Conn., a corporation of Delaware
Filed Jan. 4, 1965, Ser. No. 423,173
1 Claim. (Cl. 210—321)

ABSTRACT OF THE DISCLOSURE

A selectively-permeable membrane separation unit having a plurality of spaced-apart laminates extending in fluid communication through a wall of the unit, each laminate including a porous fluid-conducting central support lamina with selectively-permeable membranes disposed on its respective opposite surfaces.

---

This invention relates to techniques of separating constituents of fluids and slurries by the use of selectively permeable membranes. More specifically, the invention pertains to membrane-separation structures and devices and to methods of manufacturing the same.

A number of processes involving the treatment of slurries or liquids with permeable separation membranes are conventional, for example, reverse osmosis, ultrafiltration, and dialysis. Further, a large class of selectively permeable membranes and the processes for making them are known. The class exemplarily includes, but is certainly not limited to, materials such as cellophane, cellulose acetate and, more recently, poly-electrolytes. Most types of the known selectively permeable membranes can be produced with permeability characteristics appropriate for the requirements of a specific separation. However, as the details of the above-mentioned facets of the membrane-separation technology form no part of the present invention and are described elsewhere in the technical literature, they are not described in any further detail here.

The practical application of such known processes and materials to specific separation operations has been greatly hampered by the structural and fabrication problems encountered in attempting to present large surface areas of the membrane to the feed liquid without unduly increasing the cost and volumetric size of the separation equipment. To a large degree these problems exist because the selectively permeable membranes are thin and have low tensile strengths whereas efficient operation of the separation processes requires relatively high pressure differentials across the membrane. The membrane therefore needs a supporting structure to carry the pressure differential loads without interfering with the flow of effluent through and away from the membrane.

In the prior art, several membrane-separation units have been proposed which incorporate relatively expensive membrane supports. For example, it is known to assemble a plurality of membrane films each supported by its own specially channelled support in a stack similar to the plate and frame structure found in filter presses. Further, as exemplified in United States Patent 2,987,472, it is known to support membranes on rigid porous structures such as ceramic materials. However, these conventional membrane support arrangements greatly increase the cost of the separation units because of the expense of the materials utilized and because of the cost of forming the effluent channels therein. Additionally, both of these prior art techniques involve the inherent high costs of plate and frame construction. Further, the use of rigid porous ceramic supports suffers the major disadvantage that the support itself is of disproportionate thickness in comparison with the thickness of the membranes or in comparison with the minimum thickness required to carry off the effluent flow. That is, with these supports in a plate and frame construction, it is not practical to use support sheets of the extreme thinness which would be desirable and necessary to construct a separation unit having extremely high membrane surface area per unit volume.

It is, therefore, a primary object of the present invention to provide unique, economical, improved separation units having high membrane surface areas per unit volume.

To achieve this object, the present invention provides, inter alia, a novel and improved membrane support arrangement which carries the fluid pressure loads encountered during operation and drains away the effluent material separated from the feed without occupying a disproportionately large volume in the separation unit. For this purpose, it has been discovered that certain thin, inexpensive, generally flexible, sheet-like materials which are capable of internally conducting effluent can accomplish these purposes to advantage. Suitable materials exemplarily include resin treated paper, glass fiber mat, open foamed plastics, and sintered plastics. Membrane films are disposed on opposite sides of the support sheet or core lamina, and the resulting membrane laminate is assembled in a separation unit so that it is exposed to feed pressure on its opposite side and is thus only subjected to compressive loads. The fluid-conducting interstices in the support lamina serve to drain away effluent along the plane of the laminate. Suitable treatment of core lamina material can strengthen the inter-structural bonds therein to the extent that the laminate has sufficient compressive strength, even when wet, to withstand the compressive pressures without suffering collapse of the interstices.

The use of the above-mentioned flexible membrane support materials according to this invention greatly facilitates and reduces the cost of construction of separation units because the materials are easy to cut and handle without breakage and because they are generally flexible, at least in one stage such as before the curing of a resin treated support material, and are therefore relatively easy to bend into configurations suitable for construction of a separation unit.

The novel membrane laminates of this invention are incorporated into a separation unit in an improved manner by assembling them into a layered stack with corrugated feed conduits or spaces therebetween. The feed conduits are defined by corrugations formed in adjacent laminates or by corrugated spacers incorporated in the laminate stack in alternating relation with the laminates. The stacked laminates are then sealed together by a partition formed along at least one edge of the laminates so as to separate the feed spaces therebetween from an effluent chamber outside the partition and remote from the laminates. The partition is provided in a unique manner with open communications between interstices of the support laminae and the effluent chamber in a manner fully described below.

In one specific embodiment, the laminate stack of the present invention is formed by spirally wrapping continuous sheets of laminate material to form adjacent coils which are spaced apart by axially extending feed conduits. The above-mentioned partitioning technique is then utilized at one axial end of the spiral wrap to seal off the feed conduits and to open the interstices of the core lamina of the spiral to communicate with a sealed effluent chamber. Further, a unique axial flow of the feed fluid is provided by a novel arrangement of the feed conduits in relation to the feed inlet and the concentrate outlet, as fully described below. Thus, the invention provides the advantages of economy and ease of construction which are inherent in a spiral wrapping technique while the "open communication" partition technique and the feed conduit arrangements avoid the necessity of long circuitous spiral flow paths for either the feed or the effluent in the unit.

Accordingly, other objects of the present invention include:

(1) The provision of improved methods of making membrane-separation laminates for use in separation cartridges.

(2) The provision of improved methods of assembling membrane-separation laminates to provide feed conduits therebetween.

(3) The provision of improved methods of assembling membrane-separation laminates in spaced, stacked relationship with a partition along at least one edge of the laminates to seal off the inter-laminate spaces while providing through-partition communications to the laminate cores.

(4) The provision of improved methods of making spirally configured membrane-separation cartridges.

(5) The provision of improved low-cost, low-volume support material for selectively permeable membranes.

(6) The provision of improved membrane-separation laminates which can be easily configured for assembly into separation units, which are resistant to the thermal and mechanical shocks encountered during construction and operation, and which facilitate the handling of the laminates during construction of the units.

(7) The provision of simple and economical spacing means for utilization between stacked laminates in a membrane-separation unit.

(8) The provision of improved separation units having disposable, low-cost membrane-laminate cartridges.

(9) The provision of spirally configured membrane cartridges having improved and reliable flow paths.

These and other objects of the present invention will become more fully apparent from the following description and appended claims when read in conjunction with the accompanying drawings wherein:

FIGURE 9 is a longitudinal section of a further separation unit incorporating a cartridge assembly of the laminates of FIGURE 1.

FIGURE 10 is a transverse section of the separation unit of FIGURE 9 taken substantially on line 10—10.

THE LAMINATES

Figure 1:
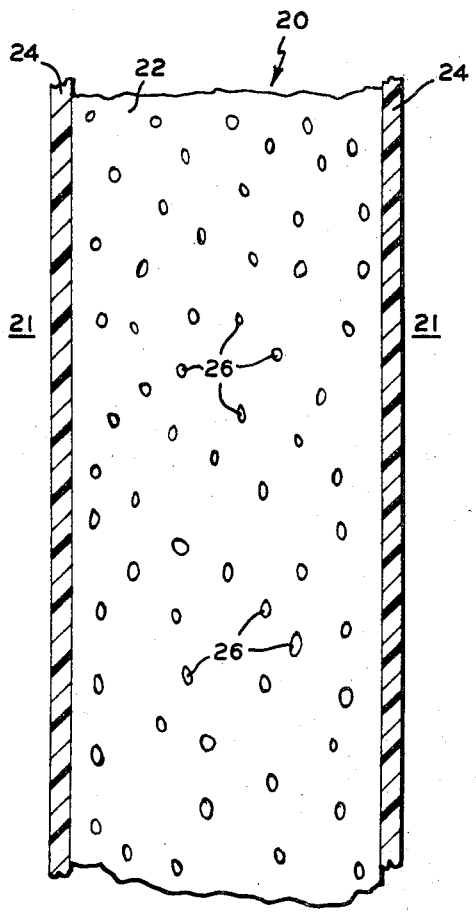
FIGURE 1 is a schematic, fragmentary cross section of a membrane-separation laminate according to the present invention.

Referring to the drawings in detail, FIGURE 1 schematically shows the basic membrane laminate 20 of the present invention which permits the improved, low-cost, unique separation devices herein disclosed. Laminate 20 provides an economical presentation of large areas of membrane to feed spaces or conduits 21 which are external to the laminate and which receive the fluid to be separated from feed structures fully described below. To support the thin, weak membranes to withstand the pressure differential load during operation, laminate 20 has a fluid-conducting central support on core lamina 22 with the selectively permeable membranes 24 disposed upon the opposite surfaces thereof. Interconnected spaces or interstices 26 in core lamina 22 are capable of conducting effluent away from the interior surfaces of membranes 24.

It should be noted that FIGURE 1 is merely schematic in that it does not show the interconnections between interstices 26 and in that it fails to show true proportional relationships between the interstitial spaces and the solid portions of the core. That is, suitable lamina materials provided interstitial spaces which will usually be proportionately larger than the solid matrix of the core.

Preferably the core lamina material is, at least in one stage, flexible and non-brittle and can be cut, machined, shaped, bent, and configured easily. However, it is further necessary that the core lamina material have sufficient compressive strength when wet to support the membranes under operating pressure differentials without collapsing and closing off the effluent-conducting interstices. One suitable material is a resin-impregnated paper; however, other materials, such as resin bonded glass or plastic fiber matting, resin bonded granular solids, or an open foamed plastic having interconnected cells may be utilized.

In one specific example of the present invention, core lamina 22 is a phenolic-treated filter paper approximately $\frac{1}{32}$ inch thick which uncured is relatively flexible and which can therefore be suitably configured or formed for use according to the present invention. However, after such forming, this laminate is cured by suitable treatment in order to form inter-fiber bonds within the paper to increase the compressive strength of the paper to withstand fluid pressures applied to the membranes during operation. As this curing is accomplished after any necessary configuring of the laminate, the curing has no adverse affect on the desirable flexibility of the core material and the laminate as a whole.

For ease in handling and configuring the laminate and to permit proper sealing in the assembled separation unit according to the present invention, the surface membranes 24 preferably cohere to the surfaces of core lamina 22. Several exemplary techniques to accomplish such cohesion are described herein. Thus, a permeable glue can be utilized between the core lamina and the membrane, or a bonding agent can be applied to the core lamina in a manner such that only the solid surface matrix is coated. Then when the membrane is applied to the core, the interstices will be free to communicate directly with the surface of the membrane without the interposition of a coating of the bonding agent. Further, in one technique for forming selectively permeable membranes, the membrane material as cast contains a solvent. When the cast membrane is partially dry it is somewhat sticky and if applied to the core lamina at this time, a bonding therebetween will take place. Still further, the membrane may be cast directly on a core lamina which has been suitably prepared to prevent the membrane material from soaking into the core interstices. Cohesion will then take place between the surface matrix of the core lamina and the membrane. Finally, a temporary cohesion of the membrane to the core lamina may be accomplished by utilizing a liquid film therebetween during construction of a cartridge so as to facilitate the handling of the laminate as a unit.

By the structure and techniques discussed in relation to FIGURE 1, the invention achieves a unique, economical, and improved support for the thin and relatively weak membranes 24 to enable them to withstand the pressure differentials existing between the feed and effluent surfaces of the membrane during operation. Further, by the use of a flexible core material, the invention provides an inexpensive support system for the membranes which is resistant to the thermal and mechanical shocks which may be encountered during assembly or operation of a separation unit. The invention provides a coherent laminate which may be conveniently handled, formed, cut, and machined during assembly of the laminate into a unit without encountering any separation of the membranes from the support lamina.

LAMINATE SPACING

Figure 2:
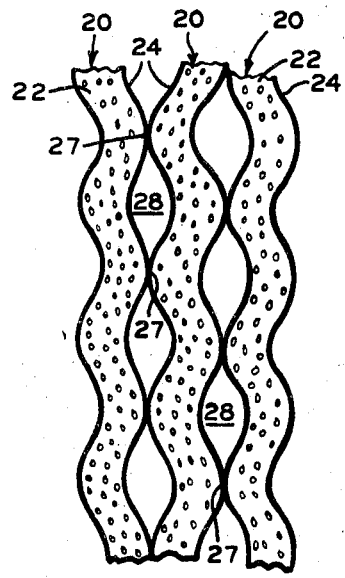
FIGURE 2 is a schematic, fragmentary section of an assembly of the laminates of FIGURE 1 configured so as to provide flow conduits therebetween.
Figure 3:
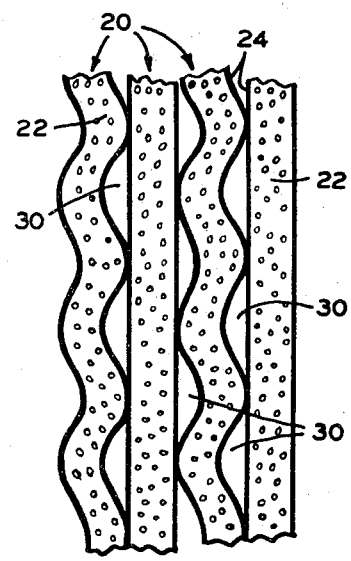
FIGURE 3 is a schematic, fragmentary section of a modified assembly of the laminates of FIGURE 1.
Figure 4:
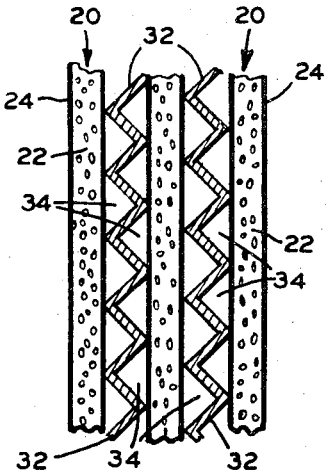
FIGURE 4 is a schematic, fragmentary section of a further modified assembly of the laminates of FIGURE 1 which incorporate corrugated spacers to provide feed conduits between the laminates.
Figure 5:
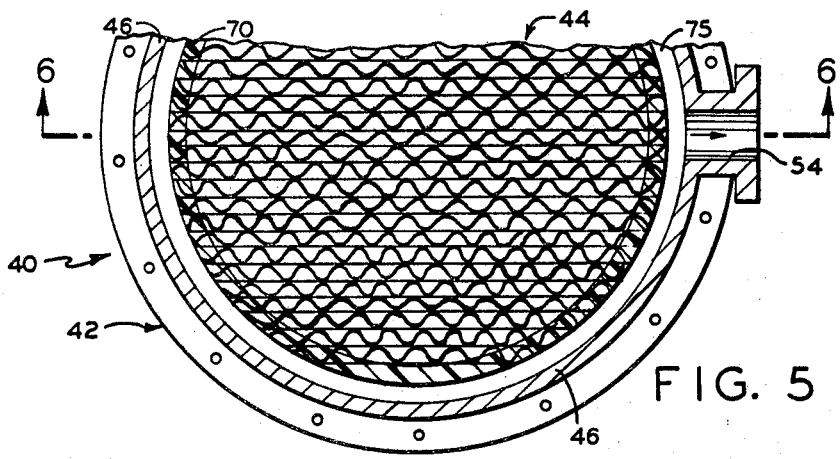
FIGURE 5 is a fragmentary, transverse section of a membrane-separation unit incorporating a cartridge assembly of the laminates of FIGURE 1.
Figure 6:
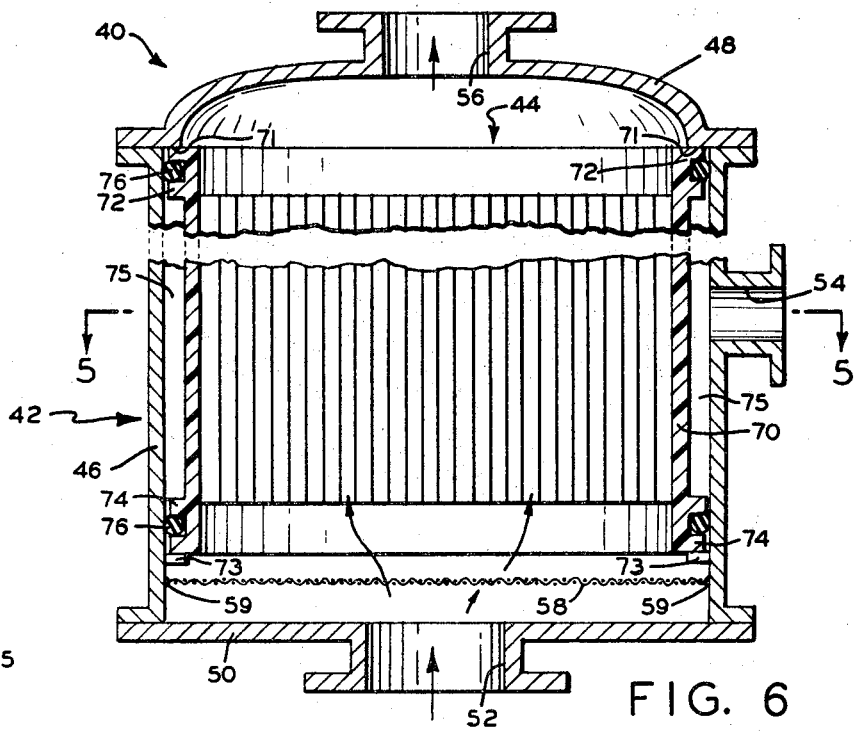
FIGURE 6 is a longitudinal section of the separation unit of FIGURE 5 taken substantially on line 6—6.

Referring now to FIGURES 2, 3, and 4, the techniques of assembling or stacking laminates 20 of the present invention into an assembly suitable for use in a compact and efficient separation unit are shown.

In FIGURE 2, the membrane laminates 20 are formed with corrugation-like folds. Adjacent laminates 20 are then positioned "out of phase" with each other so as to contact at their "high points" 27 to form parallel inter-laminate spaces 28 which serve as conduits for supplying the feed material to the membrane surfaces.

As shown in FIGURE 3, it may be desirable to corrugate only a portion of the laminates, for example every other one, thereby decreasing costs and eliminating the necessity of attaining the "out of phase" positional relationship of the FIGURE 2 embodiment while still forming inter-laminate spaces or conduits 30.

Further, it may be preferable, as shown in FIGURE 4, to space adjacent laminates 20 by independent means such as spacers 32 which are formed of an impervious corrugated sheet material, plastic or metal being suitable. Spacers 32 when positioned between laminates 20 create conduits 34 for directing feed material to the external surfaces of membranes 24.

By the techniques exemplarily illustrated in FIGURES 2 to 4, applicant provides a reliable and inexpensive method of insuring proper spacing between adjacent laminates while at the same time providing corrugation-like conduits extending along the membrane surfaces to efficiently distribute the material to be separated to all portions of the membrane area.

SEPARATION UNIT 40

Referring now to FIGURES 5 to 8, a practical and novel separation unit utilizing the laminates described above is shown. Separation unit 40 includes an external housing 42 and an internal laminate cartridge 44 which is preferably arranged so as to be removable from the housing for replacement purposes.

Housing 42 includes a generally cylindrical body 46, a closure or cap 48, and a base 50. Components 46, 48, and 50 of housing 42 are suitably secured together in sealed relationship as by the flange techniques indicated in the drawings. Housing 42 has a feed inlet 52 in base 50, an effluent outlet 54 positioned in housing body 46, and a concentrate outlet 56 located in housing cap 48. Housing 42 of the separation unit may further include a protective screen 58 secured in the housing by any suitable mounting 59 for the purpose of protecting the laminates of the unit from oversize particles in the feed.

Figure 8:
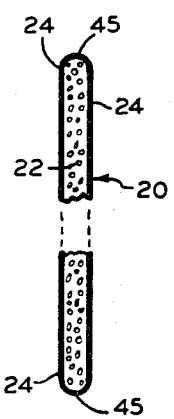
FIGURE 8 is a longitudinal section of a laminate of the separation unit taken substantially on line 8—8 of FIGURE 7.

Membrane cartridge 44 is made up of an assembly or stack of generally parallel laminates 20 (FIGURE 7) which are exemplarily shown in accordance with the spacing techniques disclosed in FIGURE 3 and described above. It should be understood, however, that the cartridge of FIGURES 5 to 8 can readily accommodate other techniques for spacing the adjacent laminates. As shown in FIGURE 8, the individual laminates 20 are closed at their axially disposed ends 45 as by a circumferential application of membranes 24 around these ends. The stack of laminates 20, which as shown has a generally circular cross-sectional configuration, is enclosed in an annular cartridge shell 70.

Shell 70 is spaced from the interior surface of housing body 46 to define an annular effluent receiving chamber 75 therebetween. The shell is sealed with respect to the housing by cartridge flanges 72 and 74, each containing a suitable recess for respective O-rings 76. Cartridge 44 is removably mounted within housing 42 as by an abutting contact of cartridge flange 72 with a shoulder 71 on housing cap 48 and by contact of cartridge flange 74 with stops 73 fixed on the interior of housing body 46.

Figure 7:
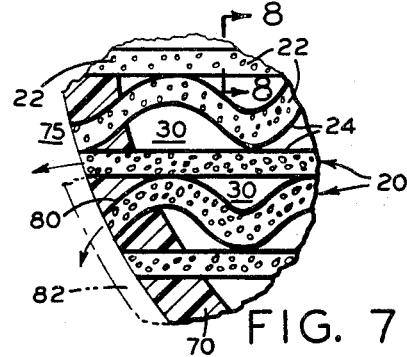
FIGURE 7 is a fragmentary, enlarged transverse section of the laminate assembly of the separation unit of FIGURE 5.
Figure 11:
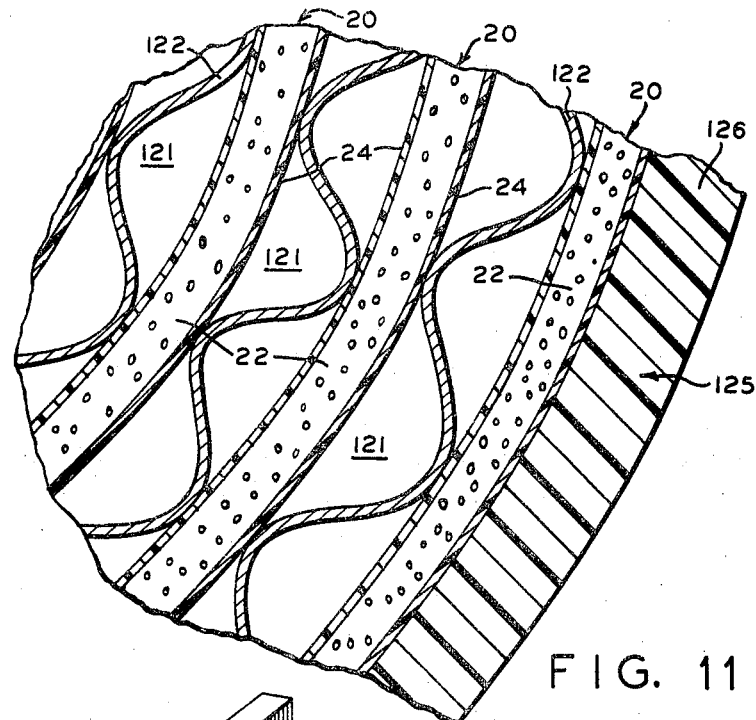
FIGURE 11 is a fragmentary, enlarged transverse section of the laminate assembly of the separation unit of FIGURE 9.
Figure 12:
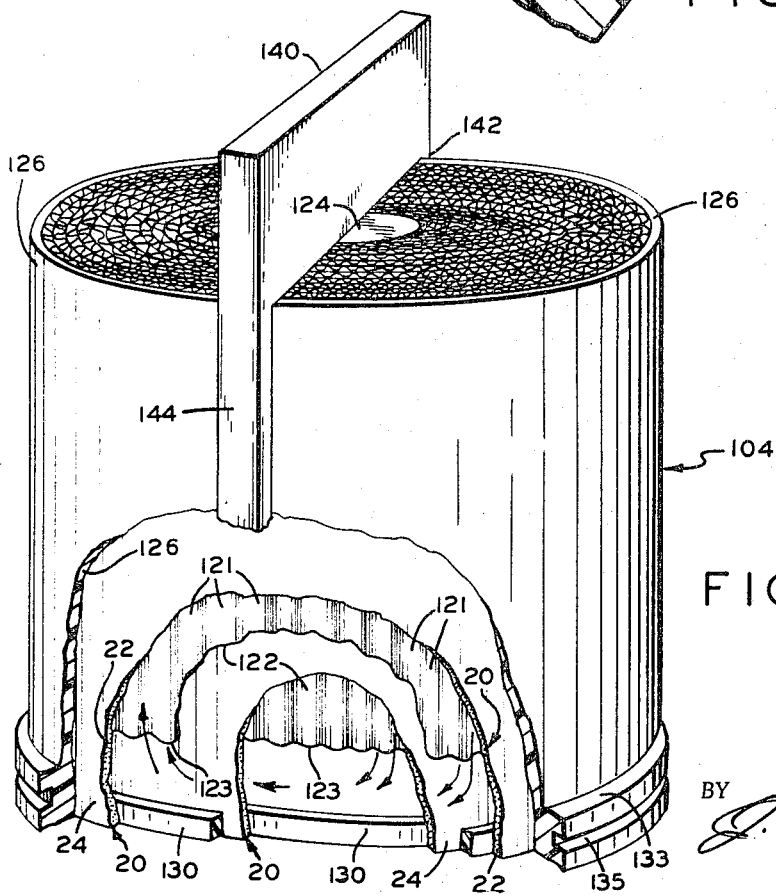
FIGURE 12 is a perspective view of the removable laminate cartridge of the separation unit of FIGURE 9.

As best shown in FIGURE 7, shell 70 of cartridge 44 is so formed in relation to transverse terminal edge portions 80 of laminates 20 that it effectively seals off the inter-laminate feed conduits 30 from the effluent chamber 75 external to the cartridge shell. However, the porous central core laminae 22 are provided with open communications through shell 70 so as to provide flow conduits from the interstitial spaces within the laminates to the effluent space 75 external to the shell.

A preferred technique of accomplishing this unique terminal-edge sealing arrangement is to cast a material which may be a polymer or other resin about the terminal edge portions 80 of the assembled laminates thereby forming the shell wall and sealing off the inter-laminate spaces as described above. It may be advantageous to utilize a centrifugal casting technique to accomplish this result. Following the casting, a portion 82 (FIGURE 7) of the cast wall is removed by machining or other suitable techniques to expose and open up the interstices of each laminate.

SEPARATION UNIT 100

Referring now to the embodiment of FIGURES 9 to 12, a separation unit 100 has an external housing 102 and a membrane-separation cartridge 104 housed therein. Housing 102 includes a flanged, generally cylindrical body 106, a cap 108, and a base 110. The components of housing 102 are suitably secured to form a sealed enclosure for cartridge 104 as by the flange techniques indicated in the drawings. Housing 102 is provided with a feed inlet 110 and a concentrate outlet 112 respectively located in diametrically opposed portions of cap 108. Further, an effluent outlet 114 is provided in base 110. Housing body 106 has cartridge support means 115 to position cartridge 104 within the housing.

Cartridge 104 has an assembly or stack of generally parallel laminates 20 which in this embodiment takes the form of the respective coils of a spiral wrap of an elongated sheet of laminate. The respective coils of the spiral are of course integrally connected at their opposite ends. The laminates 20 are closed over at least at their upper ends 120, as viewed in FIGURES 9 and 12, in a manner similar to, and for purposes similar to, the closed end technique shown at 45 in FIGURE 8. That is, membranes 24 preferably extend continuously from one surface of core lamina 22 around ends 120 of the laminate. The laminate spiral is preferably positioned around a central column or post 124 and is enclosed within a cartridge shell 125 which has an outer, generally cylindrical wall 126.

In the separation units of FIGURES 9 to 12, a laminate spacing technique generally similar to that shown in FIGURE 4 has been incorporated. However, it should be understood that other laminate spacing techniques would be suitable. Thus, as shown, corrugated spacers 122 are provided between the adjacent coils of the laminate spiral to form axially extending flow conduits 121. Like the laminate, the spacers are also preferably in the form of a continuous, elongated corrugated sheet configured in spiral form. Spacers 122 terminate axially in a lower edge 123 above the lower or base end of laminates 20 for purposes fully described below.

At the lower end of cartridge 104, shell 125 is completed by a transverse partition or wall 130 formed so as to sealingly close off the inter-laminate spaces from an effluent chamber 132 which is external to partition 130 and remote from laminates 20. The outer periphery 133 of partition 130 has an annular seal to close off the effluent chamber from the upper or cap end of the housing. As illustrated, this seal takes the form of an O-ring 134 (FIGURE 9) positioned in a suitable recess 135 in the periphery of shell partition 130.

Cartridge 104 has a dividing wall 140 extending diametrically across the upper end of the housing in sealing relation between housing cap 108 and the upper end of the cylindrical portion of the cartridge, that is, center post 124, the spiral configuration of laminates 20 and spacers 122, and cartridge shell wall 126. In the specific embodiment shown, dividing wall 140 also has legs 142 and 144 extending down the outside of shell 125 so as to complete the diametric seal between the housing and the cartridge to define a feed chamber 150 and a concentrate chamber 152.

The following technique is advantageously used in constructing cartridge 104 of the present invention. An elongated sheet of laminate, which preferably has all four of its edges sealed, as for example by closing over the edges with membrane material as described with respect to edges 129, is wrapped with an elongated sheet of corrugated spacer material around a central post 124. In the wrapping process, the upper edges of the spacer sheet and the laminate sheet are coincident whereas the spacer sheet terminates short of the lower edge of the laminate sheet.

Upon completion of the spiral wrapping procedure, a cylindrical cartridge wall may be cast about the external cylindrical surface of the spirally wrapped assembly, or preferably the assembly is wrapped with a thermo-setting plastic tape. The dividing wall 140 with its downwardly extending side legs 142 and 144 is then set in position and secured to the encased spiral assembly.

This assembly is then placed in a thermosetting molding compound so as to form the lower transverse cartridge partition 130 and to seal off the spaces between adjacent laminate coils. After solidification, the cast partition 130 is machined, in a manner similar to that described above in conjunction with FIGURE 7, so as to open up the interstices of core laminae 22 to communicate with effluent chamber 132 below the partition.

OPERATION

At the outset, it should be noted that the separation units shown in FIGURES 5 to 8 and FIGURES 9 to 12 may be operated in any positional attitude. The illustrated orientations of the units are merely exemplary and in no way limit the teaching of the present invention.

Referring to the embodiment of FIGURES 5 to 8, a feed slurry or fluid is introduced through feed inlet 52 and passes through screen 58 into the membrane cartridge 44. The feed material passes upwardly through inter-laminate spaces 30 between opposed membrane surfaces 24 on adjacent laminates 20. As a fluid pressure differential exists between inter-laminate spaces 30 and interstitial spaces 26 within the core laminae, a separation of the selected constituents of the feed slurry will take place. That is, the fluid with or without dissolved constituents of the feed will penetrate selectively permeable membranes 24 and pass into interstitial spaces 26. The material rejected by the membranes remains in the conduits 30 and is carried along to the discharge end thereof by the fluid flow through the unit. This reject material or concentrate is discharged from separation unit 40 through concentrate outlet 56.

The effluent which penetrates membranes 24, passes along the plane of core lamina 22 through the interconnected interstices thereof to discharge into effluent chamber 75 through the opened laminate ends 80 where the laminates terminate in cartridge shell 70. The effluent from chamber 75 discharges from the separation unit through outlet 54.

In the embodiment of FIGURES 9 to 12, a somewhat different flow arrangement is achieved. Thus, the feed fluid or slurry is introduced through inlet 110 and is distributed evenly in semi-circularly-shaped feed chamber 150 to the inter-laminate conduits 121 on the feed-side of the cartridge which communicate with this chamber. The feed material flows axially down through these conduits 121 to a point beyond the bottom edge 123 of the corrugated spacers 122. At this point the transverse shell partition 130 forces the feed material to turn and follow a circumferential path between adjacent laminates 20 around to a point on the concentrate-side of the cartridge where discharge through the other conduits 121 opening into discharge chamber 152 is possible. The concentrated feed material is then discharged through outlet 112. During the passage of the feed material through inter-laminate conduits 121 on both the feed and the discharge sides of the cartridge, the selected constituents of the feed material, for example the fluid, penetrate membranes 24 and enter the interstices of the core lamina 22. The effluent flows through the core lamina downwardly through shell partition 130 to discharge into effluent chamber 132 from which it is discharged through outlet 114.

As can be seen by consideration of the flow patterns involved in the cartridge configuration of this embodiment, the invention achieves the construction advantages that a spiral configuration offers while at the same time avoids the necessity of forcing the effluent, or the feed material for that matter, to pass through a long circuitous spiral path. It can be seen that the effluent has merely to make a short axial traverse through the plane of the core lamina to discharge into chamber 132 while the feed material makes one axial traverse down through the cartridge on the feed side and a return traverse up through the cartridge on the concentrate side with a short arcuate traverse therebetween.

The invention may be embodied in other specific forms without departing from the spirit or essential characteristics thereof. The present embodiments are therefore to be considered in all respects as illustrative and not restrictive. The scope of the invention is indicated by the appended claim rather than by the foregoing description, and all changes which come within the meaning and range of equivalency of the claim is therefore intended to be embraced therein.

What is claimed and desired to be secured by United States Letters Patent is:

1. A membrane-separation cartridge for use in a separation unit having a housing, a feed inlet, a concentrate outlet, and an effluent outlet, said cartridge comprising:

(a) a plurality of spaced-apart laminates each having a central, fluid-conducting support lamina together with selectively-permeable membranes disposed on the respective surfaces of said support lamina to define separation boundaries between said fluid-conducting support lamina and feed spaces between said laminates, said laminates having at least one set of mutually adjacent terminal edges, said spaced-apart laminates being configured as respective coils of a continuous laminate spiral;

(b) and a partition sealingly disposed across said terminal edges of the laminates to separate said feed spaces between the laminates on one side of the partition from an effluent space on the other side of the partition, said fluid-conducting laminae extending through said partition to communicate with said effluent space, said cartridge being adapted when in use in the separation unit to communicate said interlaminate feed spaces with the feed inlet and concentrate outlet and to communicate said effluent space with the effluent outlet.

References Cited
UNITED STATES PATENTS

| | | | |
|---|---|---|---|
| 2,337,579 | 12/1943 | Walker et al. | 210—487 X |
| 3,198,335 | 8/1965 | Lewis et al. | 210—321 |
| 3,219,567 | 11/1965 | Lacey | 204—301 X |
| 3,228,876 | 1/1966 | Mahon | 210—321 X |
| 3,245,206 | 4/1966 | Bonnet | 55—158 |
| 3,246,764 | 4/1966 | McCormack | 210—321 |
| 2,958,391 | 11/1960 | Rosset | 55—16 |

REUBEN FRIEDMAN, *Primary Examiner.*

F. SPEAR, *Assistant Examiner.*